Oct. 6, 1931.  C. E. FURGASON  1,826,611
UNIVERSAL JOINT
Filed May 17, 1926
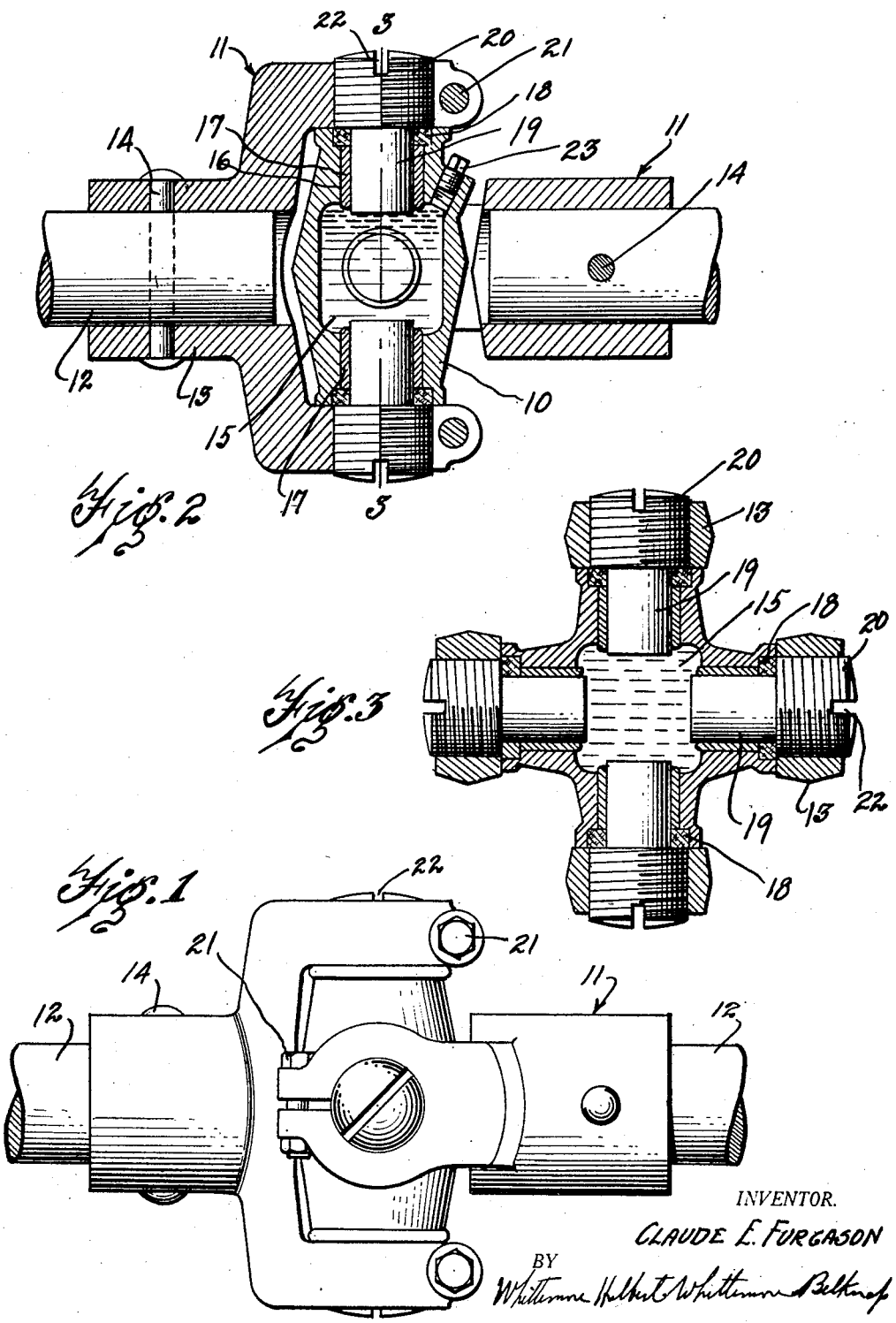
INVENTOR.
CLAUDE E. FURGASON
BY Whittemore Hulbert Whittemore Belknap
ATTORNEYS Patented Oct. 6, 1931

1,826,611

UNITED STATES PATENT OFFICE

CLAUDE E. FURGASON, OF LANSING, MICHIGAN, ASSIGNOR TO REO MOTOR CAR COMPANY, OF LANSING, MICHIGAN, A CORPORATION OF MICHIGAN

UNIVERSAL JOINT

Application filed May 17, 1926. Serial No. 109,662.

The invention relates to universal joints and more particularly to a self-lubricating joint of this character.

Self-lubricating joints as heretofore manufactured have proven, in most instances, to be more or less unsatisfactory, particularly because of the complexity thereof. It is therefore an object of this invention to provide a universal joint of the above mentioned character which is distinguished by its simplicity and which consequently may be economically manufactured, assembled and installed.

Another object of this invention is to provide means for adjusting certain elements of the joint as the parts become worn through service to thus compensate for this wear and prevent leakage of the lubricant.

Various other objects, advantages and novel details of construction will be made more apparent as this description proceeds especially when considered with the accompanying drawings wherein Figure 1 is the side elevation of a universal joint constructed in accordance with this invention.

Figure 2 is a longitudinal sectional view therethrough and

Figure 3 is a transverse sectional view taken substantially on a plane indicated by line 3—3 in Figure 2.

Referring now particularly to the drawings wherein like reference characters indicate like parts, it will be noted that there is provided a body portion 10 to which two yoke-like members 11 are connected. The ends of the shafts 12 to be coupled are secured within the sleeve-like portions 13 of the yokes as for instance by means of pins 14.

The body 10 is provided with a chamber 15 which constitutes a lubricant receiving chamber and with a plurality of radially extending openings or passages 16 communicating with the periphery of the body 10. These passages 16 constitute bearings and may if desired be lined with bushings 17 as illustrated in the drawings. Adjacent the outer end of each bushing 17 the body is formed with a recessed portion to accommodate a packing 18.

The yokes 11 are pivotally connected to the body 10 by means of bearing pins 19 which are journaled in the bearing portions of the body 10, the journaled portion of each pin 19 extending through the associated bushing 17 and into the lubricant chamber 15. Each bearing pin 19 is arranged for detachable and adjustable connection with the yoke 11 and in the present embodiment of this invention this is accomplished by forming each bearing pin with a threaded head portion 20 which engages in a threaded aperture in the longitudinally split end of the yoke arm. The two spaced ends of the yoke arm are apertured for engagement by clamping bolt 21 whereby the bearing pin may be rigidly secured thereto. It will be noted that the head 20 of each bearing pin engages the packing 18 and at the outer end thereof is provided with a slot 22 whereby this bearing pin may be screwed inwardly to compress the packing 18 to provide a leak-proof joint between the parts.

Lubricant may be supplied to the lubricant chamber 15 through an opening closed by a plug 23 and with a supply of lubricant interiorly of the body 10 the bearing surfaces of the bushing 17 and bearing pins 19 will be lubricated by centrifugal action upon the rotation of the joint. The lubricant will flow outwardly along the surface of the bearing pins 19 to the packing 18 but a small quantity of this lubricant will escape past the packing ring 18 to lubricate that portion of the yokes 11 and body 10 which engage one another. In this connection it will be noted that the thrust upon the joint will be taken by the ends of the yoke bearing upon the adjacent portion of the body so that these thrusts are not absorbed by the packing or washers 18. Obviously in case of excess leakage of the lubricant past the packing ring 18 the bolt 21 may be loosened and the bearing pins 19 screwed in further to cause the heads 20 thereof to further compress the packing ring 18 whereupon the bolts 21 will again be tightened to lock the bearing pins 19 in their adjusted position with respect to the yokes 11.

The herein described construction not only affords an entirely satisfactory self-lubricating universal joint but affords means of manufacturing the joint economically. The body 10 and the yokes 11 may be cast and suitable journal bearings provided by the insertion of the bushings 11 which may be of steel or other similar metal. Only the engaging services of the bushings 17 and the bearing pins 19 need be machined. The adjustability of the bearing pins lengthen the life of the joint as in this manner the packing rings may be adjusted to compensate for wear occasioned in service.

While one illustrative embodiment of the invention has been described and illustrated herein somewhat in detail it will be readily apparent to those skilled in this art that various changes may be resorted to without departing from the spirit and scope of the invention and to this end reservation is made to make such changes as may come within the purview of the accompanying claims.

What I claim as my invention is:

1. In a universal joint, a body, a yoke, said body and yoke having abutting surfaces for taking up the thrust upon the joint, means for lubricating said abutting surfaces, bearing pins adjustably carried by said yoke journaled in said body and means operable upon adjustment of the said bearing pins to regulate the flow of lubricant to the said abutting surfaces.

2. In a universal joint, a body formed with a lubricant chamber and radially extending openings constituting bearings, bushings in said openings, a yoke engageable with said body, bearing pins having heads threadedly connected to said yokes and shanks journaled in said bearings and packing at the outer ends of said bushing adapted to be compressed between the heads of said bearing pins and the ends of said bushings for limiting the flow of lubricant from said chamber to the engaging surfaces of said yoke and body.

3. In a universal joint, a body formed with a lubricant chamber and radially extending openings constituting bearings, bushings in said openings, yokes, bearing pins having relatively large heads threadedly connected to said yokes and reduced shank portions journaled in said bushings and packing between the outer ends of said bushings and the inner ends of the heads of said bearing pins.

4. In a universal joint, a body formed with a lubricant chamber and radially extending openings constituting bearings, radially inwardly extending, annular shoulders formed in said openings adjacent the outer ends thereof, bushings in said openings arranged with their outer ends adjacent the said shoulders, yokes, bearing pins having relatively large heads threadedly connected to said yokes and reduced shank portions journaled in said bushings, and packing between the inner ends of said heads and the outer ends of said bushings and the said shoulders.

5. In a universal joint, a body, a yoke, said body and the yoke having slidably abutting surfaces, means for lubricating said surfaces, and means carried by said yoke for regulating the passage of lubricant to said abutting surfaces.

6. In a universal joint, a body, a yoke, said body and yoke having abutting surfaces, means for lubricating said abutting surfaces, and a member carried by the yoke adjustable to regulate the flow of lubricant to said abutting surfaces.

7. In a universal joint, a body, a yoke, said body and yoke having abutting surfaces, means for lubricating said abutting surfaces, and a member carried by said yoke for connecting said yoke to said body, said member being adjustable to regulate the flow of lubricant to the said surfaces.

8. In a universal joint, a body, a yoke, said body and yoke having abutting surfaces, packing carried by the said body, means for supplying lubricant to the said packing, and a member adjustably carried by the said yoke and engageable with the said packing for regulating the supply of lubricant from the said packing to the abutting surfaces of the yoke and body.

9. In a universal joint, a body, a yoke, the said yoke being provided with a bearing surface, means for lubricating said bearing surface and a member for connecting said yoke to said body, said member being adjustable to regulate the passage of lubricant to said bearing surface.

In testimony whereof I affix my signature.

CLAUDE E. FURGASON.